March 15, 1932.  C. H. FOSTER  1,849,709
SHOCK ABSORBER
Filed Jan. 12, 1928   2 Sheets-Sheet 1
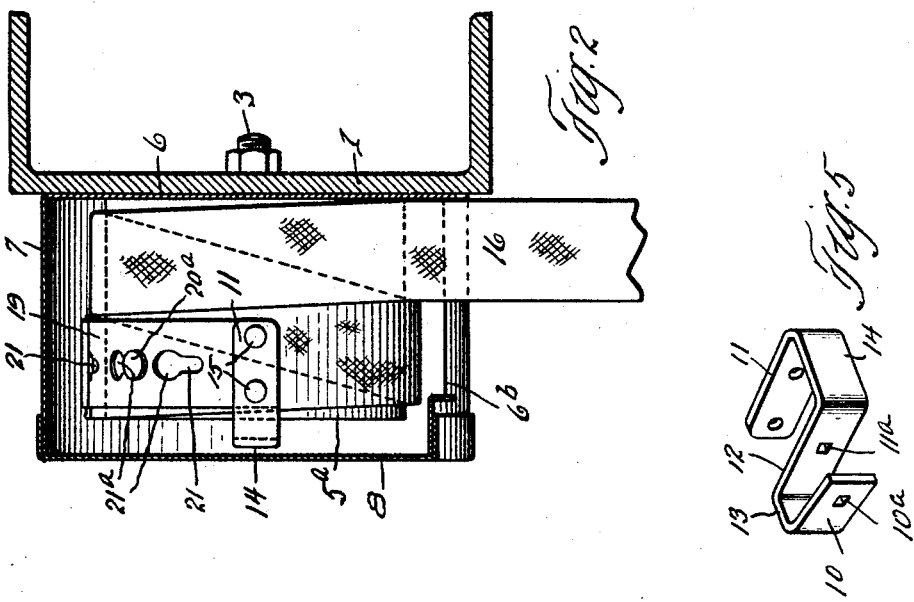
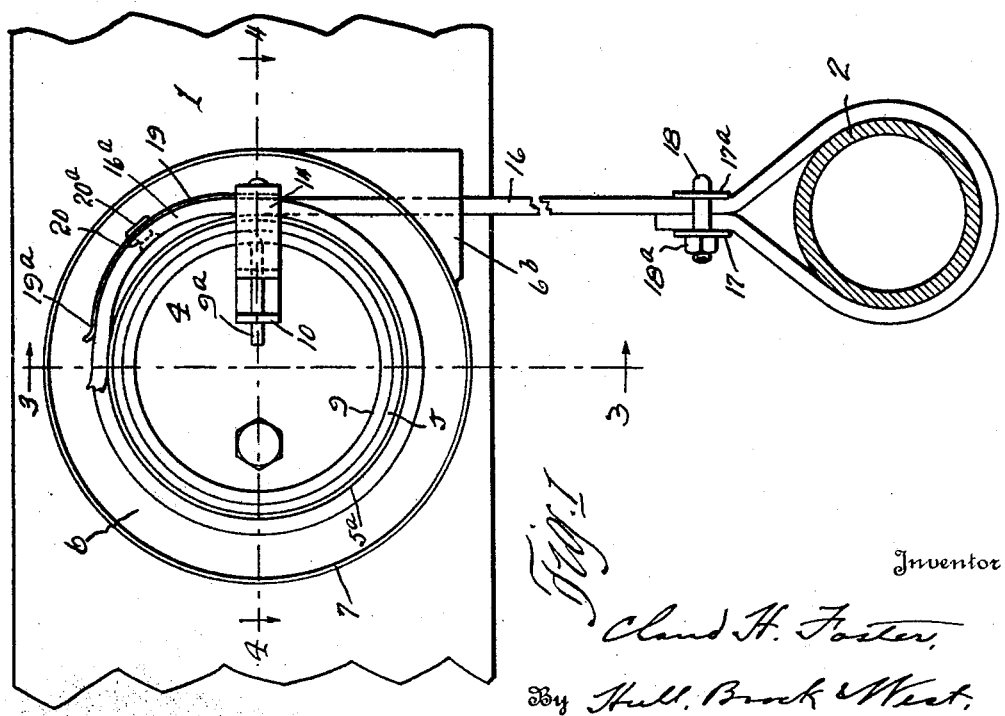

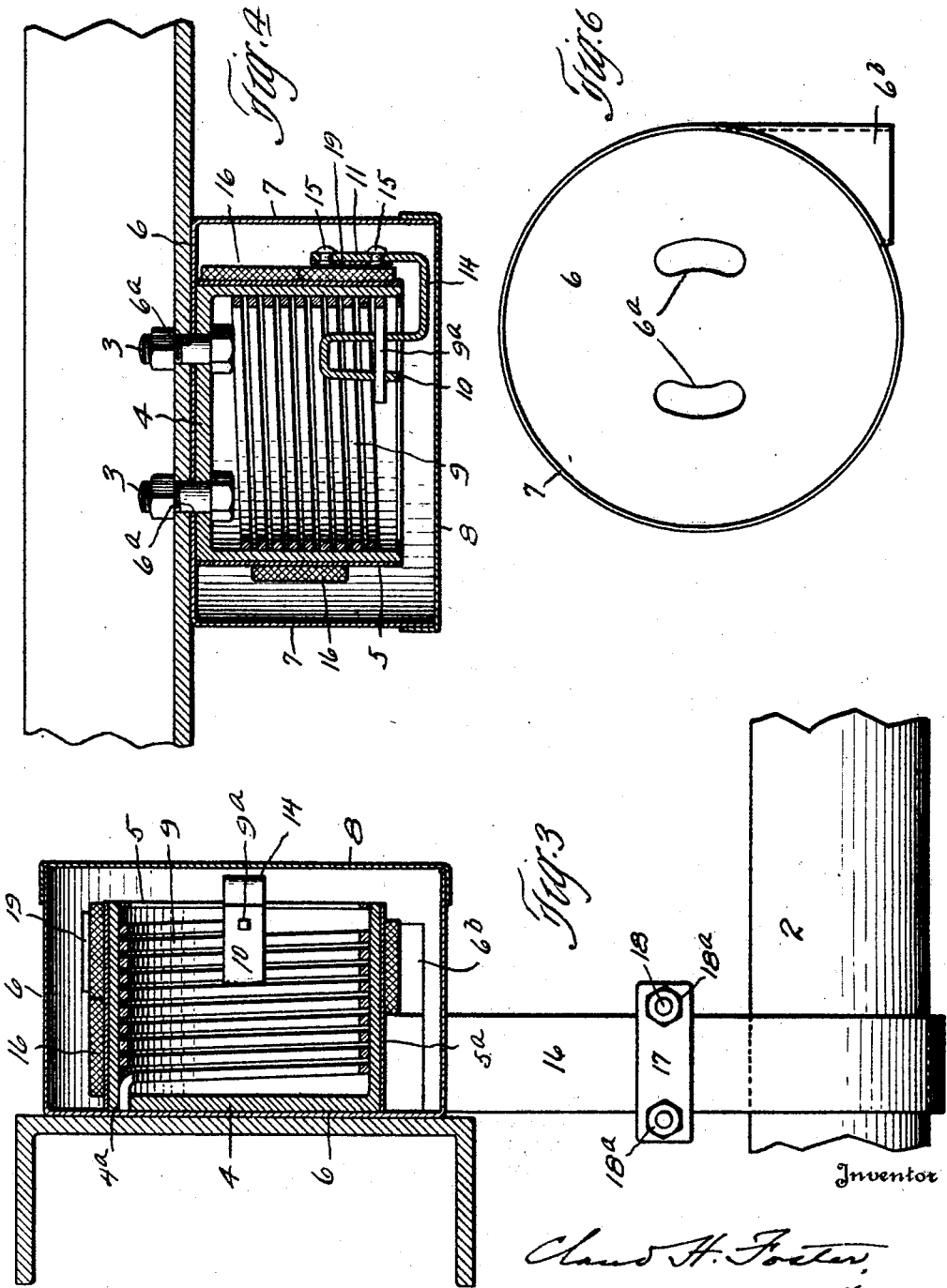

Patented Mar. 15, 1932

1,849,709

UNITED STATES PATENT OFFICE

CLAUD H. FOSTER, OF WICKLIFFE, OHIO

SHOCK ABSORBER

Application filed January 12, 1928. Serial No. 246,125.

This invention relates to shock absorbers of the type wherein the separation of two relatively movable members, as the axle and body of a vehicle, is resisted by the action of a strap dragging and exerting a braking action upon a drum, a spring being employed to take in the slack of the strap as the said members approach each other.

The general purpose and object of the invention is to simplify and improve the construction and operation of devices of this character. More limitedly, the invention consists in providing means whereby a desired amount of frictional drag or braking action may be obtained; also to provide such devices with means whereby such frictional drag or braking action may be varied to suit varying installations and varying conditions of use. Further and more limited objects of the invention will appear hereinafter and will be realized in and through the construction and arrangement of parts shown in the drawings, wherein Fig. 1 represents an elevation of my device, showing the same applied to one of the frame members and the axle housing of a vehicle, the cover of the device being removed and the axle housing being shown in section; Fig. 2 a sectional side elevation of the said device and of the vehicle frame member; Figs. 3 and 4 details in section corresponding respectively to the lines 3—3 and 4—4 of Fig. 1; Fig. 5 a detail in perspective of the connecting clamp which secures the strap to the spring within the drum; and Fig. 6 a detail in elevation of the base of the casing of said device.

Describing the parts herein by reference characters, 1 denotes a part of one of the side members and 2 the axle housing of a vehicle, such as an automobile. Secured to the frame member 1 by bolts 3 is the base 4 of a cup-shaped brake drum, the cylindrical wall of which is indicated at 5, 5$^a$. These bolts extend through arcuate slots 6$^a$ in the bottom 6 of a housing for the drum. The outer wall of this housing is indicated at 7, and the housing is provided with a removable cover 8. Mounted within the brake drum is a spiral spring 9, preferably in the form of a helix, having its inner end anchored in an aperture 4$^a$ in the base of the drum. The outer end of this spring is connected to the brake strap (to be described hereinafter) by an S-shaped clip, the said clip comprising end portions 10, 11, an intermediate portion 12, and portions 13 and 14 connecting the end and intermediate portions. The end portion 10 and the intermediate portion 12 are provided each with an aperture 10$^a$, 11$^a$, respectively, these apertures being shown as substantially square or rectangular to conform to the contour of the outer end 9$^a$ of the spring 9. It will be noted that the parts 10 and 12 are not parallel, but diverge somewhat from the connecting portion 13. The openings 10$^a$ and 11$^a$ are so arranged that, when the parts 10 and 12 are pressed toward each other, the centers of these openings will be in a line extending at right angles to the said parts. By passing the end 9$^a$ of the spring through these openings when the parts 10 and 12 are so pressed toward each other and then releasing the pressure and allowing the parts to assume the positions shown in Figs. 4 and 5, the part 9$^a$ of the spring will be effectively gripped by engagement of the same with the walls of the openings in the two parts of the clip.

The parts 10, 13 and 12 of the clip or connector extend within the drum while the part 14 extends across the outer end of the drum; the part 11 is connected by rivets or other suitable means, indicated at 15, to a curved flat spring plate which in turn is connected to the brake strap 16. The lower end of this strap passes around and is secured to the housing 2, as by means of clamping plates 17, 17$^a$ and a U-bolt 18 extending through said plates, the plates being forced toward each other by means of the nuts 18$^a$. The inner end of the strap 16 passes freely beneath the part 11 of the clip or connector, thereby providing an end portion 16$^a$ of considerable length projecting beyond such clip or connector. To the other surface of this inner end portion of the strap, the curved flat spring plate 19 is applied, the outer end of the spring plate being secured to the clip or connector by the rivets 15 and the opposite inner end extending inwardly above the drum 5, 5$^a$. This spring plate is of greater curvature than the drum, and an intermediate part of the end portion 16ª of the strap is connected to the spring, as by means of a rivet 20 secured to the strap and having a head 20ª adapted to be inserted through the enlarged ends 21ª of keyhole slots 21 in the spring. The extreme inner end 19ª of the spring plate presses the part 16ª of the strap thereunder against the outer surface of the drum 5, 5ª, and the amount of the braking action secured thereby may be varied by varying the position of the rivet 20 so that its head may enter the enlarged ends of different keyhole slots 21. Three keyhole slots are shown in the drawings; and the maximum braking action will be obtained by connecting the strap end to the innermost keyhole slot, thereby bringing the connection nearest to the inner end of the spring. By shifting the connection toward the connector 10—14 and away from the inner end of the spring 19ª, a correspondingly diminished braking action of the strap on the drum will be secured.

It will be noted that the strap 16 has approximately one complete turn about the drum 5, 5ª when the parts are in the position shown in the drawings, this position corresponding to the position of the vehicle members 1 and 2 under ordinary or normal riding conditions.

With the parts constructed and arranged as described and the spring 9 being under compression, should the members 1 and 2 approach each other (as by the vehicle wheels striking an obstruction) the said spring will take in the slack of the strap 16, the action of the spring being exerted upon the strap through the spring plate 19 and the connections 20—21ª and the strap sliding freely on the drum. However, as soon as the members 1 and 2 start to separate, the pull upon the strap will straighten the part of the end portion 16ª between the rivet 20 and the connector, thereby increasing the pressure of the end part 19ª of the spring 19 against the part of the strap thereunder with like increase in pressure of this part of the strap against the drum. A slight pressure or grip exerted by this end of the strap against the drum will be sufficient to produce a considerable drag or braking action of the body of the strap upon the drum. Furthermore, by varying the point of connection between the strap and the spring 19, this initial pressure may be correspondingly varied, enabling the braking action to be increased or decreased, as desired.

The comparatively light but yielding pressure exerted on the inner end of the strap 16 by the spring 19 gives the same effect as would be obtained by increasing the frictional contact surface between the strap and the drum.

The slot 6ª in the base 6 of the casing or housing enables the latter to be adjusted so as to secure a proper lead for the strap 16 through the opening 6ᵇ in the said housing and this opening is of such width as to accommodate the varying positions of the strap 16 therein as the latter is wound upon or from the drum 5, 5ª.

It is preferable that the braking surface of the drum shall be of material which will not corrode or rust. I have found that brass is admirably suited for this purpose; and, in order to secure cheapness of construction as well as proper strength in the drum, I form the main cylindrical wall 5 and the base 4 of the drum of a more rigid but cheaper metal, such as steel, and apply to such cylindrical wall an outer cylinder 5ª of brass.

The device shown herein is particularly efficient for the purpose for which it is designed. The manner of mounting the strap and connecting the same with the spring 9 enables the strap to be retracted instantly upon the drum as the members 1 and 2 approach each other and also secures instant braking application of the strap to the drum as the said members move apart; the quicker the separating movement or rebound of these members, the more tightly will the strap grip the drum; and the adjustable connection between the strap end 16ª and the spring plate 19 provides a further variation in braking action which renders the device flexible and adaptable for various installations and incidents of use.

Having thus described my invention, what I claim is:—

1. A device of the character described comprising a brake drum, a strap slidable on said drum, a spring connected to said strap for moving the strap in one direction on said drum, said strap having an end portion extending beyond its point of connection with said spring, and means operating on said end portion to exert an initial braking action upon the drum when the strap is slid thereon against the action of said spring.

2. A device of the character described comprising a brake drum, a strap slidable on said drum, a spring connected to said strap for moving the strap in one direction on said drum, and means operating on said strap adjacent its point of connection with said spring for causing the strap to exert a predetermined braking action upon the drum when the strap is slid thereon against the action of said spring.

3. A device of the character described comprising a brake drum, a spring within said drum and having an end anchored therewithin, a strap slidable on said drum and connected to the opposite end of said spring, the said strap having an end portion extending beyond such point of connection, and a spring operating upon said end portion to exert a pressure thereof against said drum.

4. A device of the character described comprising a brake drum, a strap slidable on said drum, a spring connected to said strap for moving the strap in one direction on said drum, the said strap having an end portion extending beyond such point of connection, and means operating upon said end portion to exert a yielding pressure thereof against said drum.

5. A device of the character described comprising a brake drum, a strap slidable on said drum, a spring connected to said strap for moving the strap in one direction on said drum, the said strap having an end portion extending beyond such point of connection, and a spring plate of greater curvature than said drum and secured to the end portion of said strap and pressing a portion thereof against said drum.

6. A device of the character described comprising a brake drum, a spring within said drum and having an end anchored therewithin, a strap slidable on said drum and connected to the opposite end of said spring, the said strap having an end portion extending beyond such point of connection, and a spring plate of greater curvature than the said drum and having an intermediate portion thereof secured to the said strap by the means which connects the said strap to the first mentioned spring, the inner end of the spring plate bearing against such end portion of the strap and pressing the same against the said drum.

7. A device of the character described comprising a fixed brake drum, a spiral spring within said drum and having an end anchored therewithin, a strap slidable in friction contact on said drum, a spring plate of greater curvature than the said drum and secured at its outer end to the other end of said spiral spring, the inner end of the spring plate bearing against the inner end portion of the strap adjacent to the end thereof to press the same against the said drum, and means connecting the said spring plate intermediate of its ends with such end portion of the said strap.

8. A device of the character described comprising a fixed brake drum, a spiral spring within said drum and having an end anchored therewithin, a strap slidable in friction contact on said drum, a spring plate of greater curvature than the said drum and secured at its outer end to the other end of said spiral spring, the opposite end of the spring plate bearing against the inner end portion of the strap adjacent to the end thereof to press the same against the said drum, and longitudinally spaced means for connecting portions of the said spring plate intermediate of its ends with such end portion of said strap.

9. A device of the character described comprising a fixed brake drum, a spiral spring within said drum and having an end anchored therewithin, a strap slidable in friction contact on said drum, a spring plate of greater curvature than the said drum, a connector overhanging said drum and strap and securing the outer end of said plate to the other end of the spiral spring, the inner end of the spring plate bearing against the inner end portion of the strap adjacent to the end thereof to press the same against the said drum, and longitudinally spaced means for connecting portions of the said spring plate intermediate of its ends to the end portion of said strap.

10. A device of the character described comprising a fixed brake drum, a spring within said drum and having an end anchored therewithin, a strap slidable in friction contact on said drum, and means for connecting the said strap to the said spring, the said means comprising a resilient connecting member of substantially S-shape having one end member thereof located outside the drum and connected to the said strap and having within the drum the other end member and the intermediate member, the last two members being normally divergent and provided with openings through which the other end of the said spring is passed.

11. A device of the character described comprising a fixed brake drum, a spring within said drum and having an end anchored therewithin, a strap slidable in friction contact on said drum, and means for connecting the said strap to the said spring, the said means comprising a connector having spaced resilient members located within the drum, the said members having each an aperture therethrough for the reception of the adjacent end of the said spring, the said apertures being so arranged as to cause walls thereof to grasp the portion of the spring passing therethrough by the resiliency of said members, the outer portion of said connector being connected with the said strap.

In testimony whereof, I hereunto affix my signature.

CLAUD H. FOSTER.